T. S. SMITH.
Thill-Coupling.
No. 59,728. Patented Nov. 13, 1866.
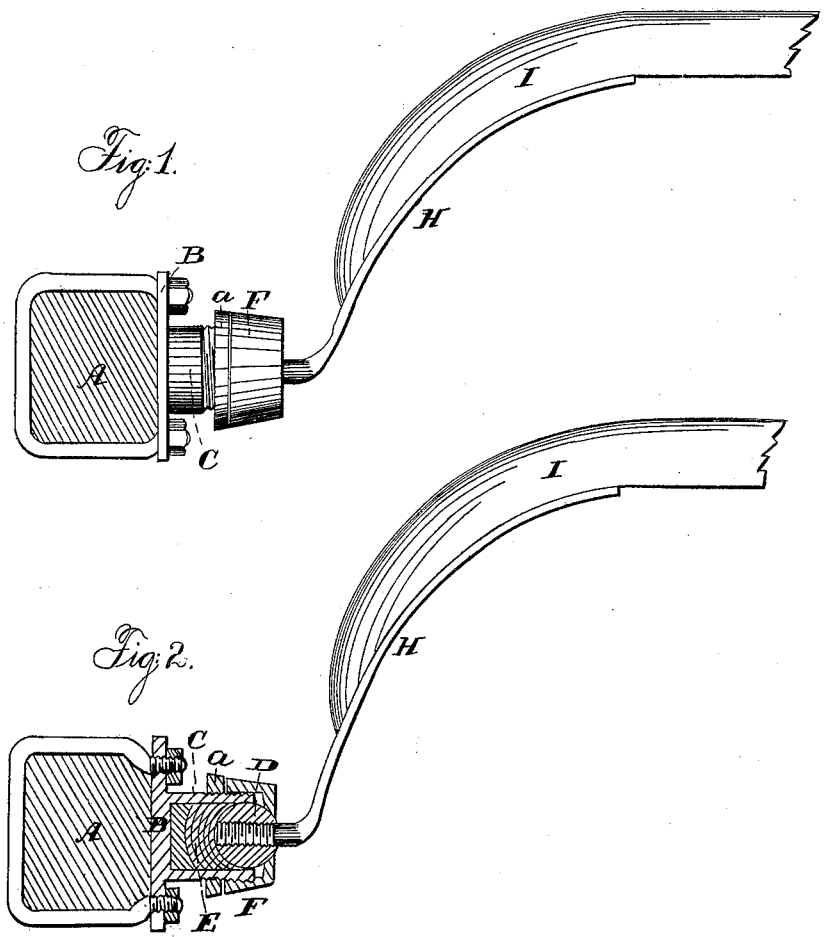

UNITED STATES PATENT OFFICE.

T. S. SMITH, OF NEW HAVEN, CONNECTICUT, ASSIGNOR TO HIMSELF, S. A. SMITH, AND HENRY LINES, OF SAME PLACE.

IMPROVEMENT IN CARRIAGE-SHACKLES.

Specification forming part of Letters Patent No. 59,728, dated November 13, 1866.

*To all whom it may concern:*

Be it known that I, T. S. SMITH, of New Haven, in the county of New Haven and State of Connecticut, have invented a new Improvement in Carriage-Shackles; and I do hereby declare the following, when taken in connection with the accompanying drawings and the letters of reference marked thereon to be a full, clear, and exact description of the same, and which said drawings constitute part of this specification, and represent, in—

Figure 1, a side view, and in Fig. 2 a central section.

My invention relates to an improvement in the connection of the shafts or pole to a carriage, commonly termed "carriage-shackles;" and consists in the peculiar arrangement of a ball-and-socket joint, whereby such joint is adapted to the purpose required; and to enable others to construct and use my improvement, I will proceed to describe the same as illustrated in the accompanying drawings.

A is the axle; B, a plate formed so as to be secured to the axle in any convenient and well-known manner, (represented in the drawings as being secured by a strap passing around the axle.) On the said plate is formed the socket C to receive the ball D. Beneath the ball I place a layer or layers of rubber, E, or other similar elastic material, which forms a seat for the ball, as seen in Fig. 2. Over the ball I place a cap, F, screwed onto the outside of the socket C, and when in proper position, as seen in Fig. 2, secure it in that position by a jam-nut, *a*, or other device.

To the ball D is fixed a strap, H, to which the shafts or pole I is attached.

By this arrangement the pole or shafts may be raised or lowered in the usual manner, and any irregular strain which is brought upon the shackle does not interfere with the proper working of the shackle, and the ball, being packed as before described, prevents rattling, and being entirely covered is not in the least injured or interfered with by mud or other foreign substance.

To detach the shafts or pole from the carriage, loosen the jam-nut *a* and remove the cap, which releases the ball from the socket, or reverse the operation to attach the shafts or pole.

I do not broadly claim a ball-and-socket joint as of my invention; but,

Having thus fully described my invention, what I do claim as new and useful, and desire to secure by Letters Patent, is—

The combination of the ball-and-socket joint provided with a packing, E, with a strap, H, or its equivalent, and constructed with a plate, B, so as to be attached to the axle, substantially as and for the purpose herein set forth.

T. S. SMITH.

Witnesses:
    JOHN E. EARLE,
    ALTSIE J. TIBBITS.